Nov. 8, 1927.
G. R. FONDA
INCANDESCENT LAMP
Filed Jan. 18, 1921
1,648,679
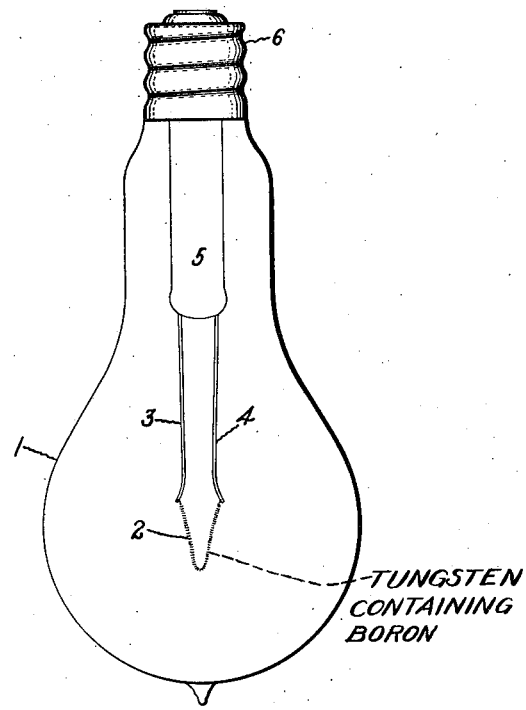
Inventor:
Gorton R. Fonda,
by his Attorney, Patented Nov. 8, 1927.

1,648,679

UNITED STATES PATENT OFFICE.

GORTON R. FONDA, OF SCHENECTADY, NEW YORK, ASSIGNOR TO GENERAL ELECTRIC COMPANY, A CORPORATION OF NEW YORK.

INCANDESCENT LAMP.

Application filed January 18, 1921. Serial No. 438,220.

The present invention comprises a new material which is particularly suitable for the manufacture of filaments or other incandescent bodies. Among the advantages of my invention is a lower vapor pressure at operating temperatures which enables lamps containing filaments of this new material to be operated with a longer life at the same efficiency as tungsten, or with a higher efficiency with the same length of life. Another advantage of my new material is its decreased tendency to sag when operating at high temperatures, particularly when closely coiled into a helix.

The accompanying drawing illustrates a lamp employing an incandescent body constituted of my new material.

Although the production of my new material or alloy is not limited to any particular process, I find it convenient to employ the method described in Coolidge U. S. Patent, 1,082,933 issued December 30, 1913. Proceeding in accordance with the process described in this patent, I add a quantity of boron, or a decomposable boron compound to the tungsten powder preliminary to consolidating the same into swageable metal. Beneficial results have been obtained by adding less than about one part of boron in one hundred parts of mixture by weight. The tungsten and boron addition are thoroughly mixed, then pressed, heat treated in hydrogen and swaged in accordance with the methods set forth in the above Coolidge patent. A material containing about 0.5 per cent boron may be worked up to the ductile state even more readily than tungsten which does not contain foreign matter. Boron compounds, decomposable at high temperature and leaving a residue of boron, as for example, boron nitride may be used in place of metalloidal boron. For example, I have prepared tungsten filaments containing 0.3 per cent of boron nitride and tests have shown these filaments have a lower vapor pressure under operating conditions than the ordinary tungsten filaments.

As already indicated, a marked advantage of wire constituted of boro-tungsten prepared in accordance with my invention is its non-sagging characteristic when used as a closely coiled filament, for example, as illustrated in the drawing. Here is shown an incandescent lamp comprising a bulb 1 containing a filament 2, connected to the conductors 3, 4, which are sealed into a stem 5 and joined to a base 6 in the usual way. The bulb may be filled with a gas, such as argon, or nitrogen, at a pressure of say, two-thirds of an atmosphere. The filament 2 has been shown somewhat diagrammatically as being a closely coiled helix and in practice it may be coiled even more closely than can be shown in the drawing. This is done to reduce heat losses. In the gaseous atmosphere the filament may be operated for a commercially useful life at lighting efficiencies materially better than one watt per candle power, that is at temperatures higher than is practicable in vacuum lamps when a commercially long life is desired. Even at these high temperatures my new boro-tungsten filament retains sufficient rigidity to resist sag and short-circuiting of coils of the helix. The filaments prepared as above described in general resemble tungsten filaments not containing boron in physical properties but are finer grained than ordinary tungsten prepared in the same way. The non-sag property of filaments made of the new material is surprising in view of the generally observed fact that fine-grained tungsten tends to sag more readily than coarse-grained tungsten.

The boro-tungsten has a somewhat higher specific resistance at room temperature than unalloyed tungsten, but at elevated temperatures the specific resistance approaches the specific resistance of unalloyed tungsten. In other words, the temperature coefficient of resistance of the new material is less than that of tungsten which does not contain boron. This characteristic indicates the formation of a solid solution of boron in tungsten.

What I claim as new and desire to secure by Letters Patent of the United States, is:—

1. The steps in the process of preparing tungsten filaments which consist in adding to tungsten in a finely divided state less than one per cent by weight of boron, thereupon consolidating, heat treating, and mechanically converting the metal to a ductile state, whereby the resulting metal is rendered finer grained, of lower vapor pressure, and less sagging at high temperature than tungsten which is unassociated with boron.

2. The steps in the process of preparing tungsten filaments which consist in adding to powdered tungsten less than one per cent of a material capable of yielding boron, thereupon consolidating the powder, heating under conditions entailing decomposition of said material and working the material into filamentary form whereby the filaments are rendered capable of operation with undiminished length of life at higher lighting efficiency than tungsten filaments unassociated with boron.

In witness whereof, I have hereunto set my hand this 14th day of January, 1921.

GORTON R. FONDA.